United States Patent [19]

Swartz

[11] 4,407,831

[45] Oct. 4, 1983

[54] WHEY PROTEIN FORTIFIED FISH AND PROCESS FOR PREPARATION

[75] Inventor: William E. Swartz, Upper St. Clair, Pa.

[73] Assignee: Nutrisearch Company, Cincinnati, Ohio

[21] Appl. No.: 224,718

[22] Filed: Jan. 13, 1981

Related U.S. Application Data

[63] Continuation-in-part of Ser. No. 108,432, Dec. 31, 1979, abandoned.

[51] Int. Cl.³ .............................................. A23L 1/325
[52] U.S. Cl. ................................... 426/281; 426/643; 426/652; 426/657
[58] Field of Search ............... 426/583, 643, 656, 657, 426/524, 802, 74, 648, 652, 331, 332, 281

[56] References Cited

U.S. PATENT DOCUMENTS

| | | | |
|---|---|---|---|
| Re. 30,023 | 6/1979 | Hawley et al. | 426/643 X |
| 2,442,663 | 6/1948 | Rinehart . | |
| 2,957,770 | 10/1960 | Freund et al. . | |
| 3,036,923 | 5/1962 | Mahon | 426/643 X |
| 3,235,386 | 2/1966 | Mykleby . | |
| 3,269,843 | 8/1966 | McKee et al. . | |
| 3,493,392 | 2/1970 | Swartz | 426/643 X |
| 3,573,063 | 3/1971 | Williams . | |
| 3,620,767 | 11/1971 | Swartz | 426/643 X |
| 3,930,056 | 12/1975 | Feminella et al. | 426/583 X |
| 3,989,851 | 11/1976 | Hawley et al. | 426/643 X |
| 4,132,809 | 1/1979 | Desrosier | 426/802 X |
| 4,161,552 | 7/1979 | Melachouris | 426/583 X |
| 4,164,589 | 8/1979 | Kadane et al. | 426/652 X |
| 4,168,322 | 9/1979 | Buckley et al. | 426/331 X |
| 4,259,363 | 3/1981 | Lauck et al. | 426/583 X |

FOREIGN PATENT DOCUMENTS 1266622 4/1968 Fed. Rep. of Germany .
2088367 1/1972 France .
6705069 10/1968 Netherlands .

OTHER PUBLICATIONS

Webb et al., *Byproducts from Milk*, 2nd ed., 1970, p. 104, Gp170.

Durand et al., "The Detection of Casein in Brines Injected into Cooked Hams", Rec. Med. vol. 147(8), 1971, pp. 853–858.

Hermansson et al., "Functional Properties of Added Protein Correlated with Properties of Meat Systems", Journal of Food Science, vol. 40, 1975, pp. 595–614.

Chem. Abstracts: 64,1262f(1966); 71,122535q(1969); 75,87157b(1971); 81,48664u & 48668y(1974); 84,88153v(1976).

Chem. Abstracts: 85,4007k(1976); 85,107596f(1976); 86,41864d(1976); 81,118697b(1974); 82,71745a(1975).

Leistner, *German Sausage; Die Fleischwirtschaft* Nr. 6/1978.

ENRPRO 50 Whey Protein Concentrate, Stauffer Chemical Co., 6–1979, pp. 1–3.

*Whey Proteins & Modern Food Processing*, Stauffer Chemical Co., 6–1977, pp. 1–26.

"Dairy–Based Ingredients–Their Expanding Role in Non–Dairy Processed Foods", Food Processing, 10–1977, pp. 40–43.

Lauck, "The Functionality of Binders in Meat Emulsions", Journal of Food Science, 40(1975); pp. 736–740.

Primary Examiner—Arthur L. Corbin
Attorney, Agent, or Firm—Cushman, Darby & Cushman

[57] ABSTRACT

Protein fortified intact fish flesh comprising intact fish flesh having incorporated therein a whey protein fortifier composition having more than about 30% by weight whey protein on a dry solids basis and process for the preparation thereof.

9 Claims, No Drawings

WHEY PROTEIN FORTIFIED FISH AND PROCESS FOR PREPARATION

This application is a continuation-in-part of Ser. No. 108,432, filed Dec. 31, 1979, now abandoned.

The present invention relates to the protein fortification of intact fish flesh.

Tuna, a member of the scombroidea group of fish, generally including tuna, albacore, skipjack, tunny, bonito, mackerel and kawakawa is a fairly large fish of high oil content which is a prime commercial fish. The white and light meat of the tuna is usually canned and sold for human consumption while the dark portions of the tuna are sold for animal food. It would be desirable to extend the yield of the white and light portion of the tuna because of the high price it commands as human food. As stated in U.S. Pat. No. 3,493,392, the yield of light and white tuna meat can be increased as much as 15% or more as compared to the yield of untreated tuna where cooking is carried out by steam alone by pumping the tuna with a solution of molecularly dehydrated phosphates or an orthophosphate alone or in admixture with salt (NaCl). In a similar manner, light meat of the bonito can also be extended by pumping with phosphates (U.S. Pat. No. 3,620,767). In each case, in addition to the increase in meat yield, the flavor and odor are less "fishy" and the meat is more tender and less dry.

The preceding methods of "extending" fish flesh have been accomplished using an inorganic phosphate with a corresponding reduction in food value per unit weight. Little work has been done on extending intact fish flesh with high quality protein to provide a product with equivalent or higher levels of protein as compared to the untreated fish.

THE INVENTION

In accordance with the present invention, intact fish flesh can be favorably extended by incorporating into the fish flesh a whey protein containing fortifier solution.

DETAILED DESCRIPTION OF THE PRESENT INVENTION

As used herein, the term "intact fish flesh" is intended to mean that the flesh is in a state recognizable as meat muscle tissue. Thus, the meat muscle tissue and muscle fiber bundles which make up the fish flesh are as in the natural state. Intact is not intended to include comminuted meats where the muscle tissue has been so reduced in size as to destroy the integrity of the muscle fiber bundle. Intact fish flesh is also intended to cover pieces of flesh which have been reduced in size from that of the original source to a size wherein the reduction has not been such that the muscle fiber bundles have been destroyed and wherein the size is sufficiently large to allow incorporation of the protein fortifier. Generally, fish flesh reduced to a particle size wherein the smallest of any dimension of the particle (length, width, depth, or diameter) is $\frac{1}{2}''$ or above is usable in the invention.

As used herein, the term "incorporating" is intended to mean inserting the whey protein fortifer composition into the muscle tissue in the natural muscle fiber bundle spaces.

The fish which can be treated in accordance with the present invention includes any fish and particularly the larger fish such as tuna, albacore, skipjack, tunny, kawakawa, bonito, halibut, mackerel, salmon, haddock, cod, whiting and the like. The fish can be treated immediately after catching or at a later date, even after freezing and thawing.

The protein extender used in the present invention comprises 75-100% of a whey protein concentrate and from about 25-0% of another protein containing source. The protein must be hydratable so that it can be incorporated (injected) into the intact fish flesh. The whey protein concentrate is required to have a minimum of about 30% protein with the remainder of the composition being lactose and ash. The optional protein source can be either animal or vegetable and can be derived from dairy sources such as milk or whey, or vegetable sources such as soy. When using soy protein as the optional protein source, care must be taken to insure that the protein is properly hydrated. Limited amounts of soy protein should be used to avoid a beany taste.

The whey protein concentrate used in the present invention can be derived from either acid whey or sweet whey as desired. Acid whey is the by-product obtained from the acid coagulation of milk protein by the use of a lactic acid producing bacteria (e.g., lactobacillus) or by the addition of food grade acids such as lactic or hydrochloric acid, i.e., by direct acidification. In either case, acidification is allowed to proceed until a pH of approximately 4.6 is reached. At this pH, casein becomes insolubilized and coagulates as cheese curd. The cheese commonly produced by this method is called cottage cheese. The whey obtained as a by-product from this method is commonly called "acid" or "cottage cheese whey".

The whey can also be derived from the production of cheddar cheese which is commonly produced by the rennet coagulation of protein. This cheese whey is commonly called "sweet" or "cheddar cheese whey". The whey from other cheese production can also be used.

The whey protein concentrate as used in the present invention is most preferably derived from 100% acid cheese whey though minor amounts of other cheese wheys of less than 50% and preferably less than 20% can be used in the preferred form.

The whey protein concentrate must be hydratable or dispersible to the extent of forming an incorporatable (injectable) solution. As used herein, the term "hydratable" is intended to include an incorporatable (injectable) dispersion. Otherwise, the protein material cannot be incorporated (injected) into the intact fish flesh. Processes which can be utilized to prepare whey protein concentrates in a hydratable form include electrodialysis (Stribely, R. C., Food Processing, Volume 24, No. 1, p. 49, 1963), Reverse Osmosis, Marshall, P. G. et al., Fractionation and Concentration of Whey by Reverse Osmosis, Food Technology 22(a) 696, 1968, Gel Filtration (U.S. Reissue Patent No. 27,806), or Ultrafiltration, Horton, B. S. et al., Food Technology, Volume 26, p. 30, 1972). Chemical methods such as phosphate precipitation as described in Gordon U.S. Pat. No. 2,388,624 and Melachouris U.S. Pat. No. 4,043,990 can be used if the products obtained from those chemical precipitation methods are hydratable.

It has been found that the most effective results have been obtained using an ultrafiltered acid (cottage cheese) whey protein concentrate containing at least about 40% whey protein. In a typical process, cottage cheese whey is neutralized to a pH of about 6.4 with 50% caustic. After storage, the pH is then adjusted to about 7.2 and any solids or precipitates are removed by centrifugal clarification. The clarified liquor is then pasteurized. The liquor is then fed into an ultrafiltration membrane unit. The retentate is condensed and spray dried. Protein products of 35% or more whey protein can be prepared by this process. One of the more preferred products prepared by this process generally comprises from about 40% to about 60% protein based on total Kjeldahl nitrogen, 10–30% lactose, 3–15% ash and 0.1–14% fat. It is preferred to use a product in the dry form to avoid the need for refrigeration though the liquid whey protein concentrate can also be used if desired. As used herein, the term "whey protein concentrate" is also intended to include any of the products prepared by other methods which have a whey protein concentration of at least 30% on a dry solids basis and which composition is hydratable under the conditions of the treatment. It is required that the protein be substantially undenatured or that the lactose, salts or any other material in the composition not cause any dissolution problems.

In addition to the whey protein concentrate, the protein fortifier can also contain from about 25% to about 0% of another protein containing composition preferably based on dairy products such as NFDM, dried whey, delactosed whey, delactosed demineralized whey where demineralization is accomplished by any known method such as electrodialysis.

The whey protein concentrate-containing protein fortifier can be dissolved in water and the solution used as is or as a vehicle for adding other flavoring agents to the raw fish flesh, such as salt, pepper, spices, herbs and the like, flavor enhancers and other such ingredients. Gelling agents such as gelatin or other ingredients can be added in this manner. The protein solution can also contain molecularly dehydrated phosphates or orthophosphates to prevent drip loss in accordance with the processes of U.S. Pat. Nos. 3,493,392 and 3,620,767, the disclosures of which are incorporated herein by reference. The phosphates are sodium and potassium salts of noncyclic molecularly dehydrated phosphates having an alkali metal oxide to $P_2O_5$ molar ratio of from about 0.9:1 to about 2:1. The whey protein concentrate is compatible with the phosphates and no special dissolution techniques are required for preparing the solution.

The protein fortifier is preferably applied as a solution to the intact fish flesh. The fish can be treated as caught if the fishing boats are equipped with such equipment. The fish can also be immediately frozen and kept in that condition until thawed for canning. Thawed tuna or fresh tuna are eviscerated and then cooked for 2-4 hours at 100°-103° C. before separating and canning. The protein can be applied before or after cooking.

The protein fortifier and any phosphate is pumped into the raw or thawed flesh of the tuna before cooking to provide a whey protein level of 1.5%. The type and amount of phosphate which can be used are disclosed in U.S. Pat. Nos. 3,493,393 and 3,620,767.

Molecularly dehydrated phosphates used to prevent a significant loss of thawing drip in accordance with U.S. Pat. No. 3,036,923, the disclosure of which is hereby incorporated by reference, can also be used in combination with the protein fortification of the invention.

The protein fortified solution can be incorporated in the intact fish flesh i.e., incorporated in the muscle tissue in the natural fiber bundle spaces, using any known means for that purpose, such as injection, stitch pumping, vein or artery pumping, osmosis (with or without pumping), topical high pressure injection, or combinations thereof. The preferred incorporation methods include stitch pumping, vein or artery pumping and injection. The technique utilized will be governed by the fish and the desires of the processor.

The incorporation (injection) solution should contain a sufficient amount of protein to allow for convenient application. Protein solutions in excess of 17% are not preferred as they tend to clog injection systems. Preferably, solutions for injection systems contain from about 12% to about 17% protein. It is preferred to supplement the protein content of the green fish by at least about 1%, preferably 5% by weight. Alternatively, it is preferred to increase the protein content of the final product by at least 1%. The upper limit is the amount of protein the meat can hold. It is more preferred to add sufficient protein so that the protein content of the fortified product is equivalent to a protein level of at least 90% of the protein level of the untreated flesh and in an amount sufficient to provide the proper moisture to protein ratio.

The term "intact fish flesh" includes whole fish whether eviscerated or uneviscerated, headed or beheaded, fresh or thawed. The term also includes intact fish flesh parts such as fillets, cut fillets, fish sticks prepared from intact fish flesh, and steaks. These parts can be obtained from fresh or frozen fish flesh. The term is also intended to cover raw, frozen, thawed and cooked (bake, steam, smoke, microwave) flesh. The flesh can be breaded in a sauce or coating as is conventional.

Fish fillets are prepared by cleaning, scaling, sorting and inspecting raw or iced fish. After scaling, the fish are filleted either by hand or machine. After a short immersion in a brine solution for cleaning or a brine/phosphate solution to reduce drip loss on thawing (U.S. Pat. No. 3,036,923), the fillets are packed in a container and quick frozen (see Food Products Formulary, Vol. 1, Meats, Poultry, Fish and Shellfish, S. L. Komarik et al., p. 292). The teachings of this reference are incorporated herein by reference. The raw fish and/or the fillets can be treated in accordance with the invention prior to freezing. The steaks cut from the fish can be treated in accordance with the invention either fresh or thawed.

Fish sticks and cut fish fillets can be prepared by freezing boneless and skinless fish fillets into a block followed by sawing the desired fillets or sticks from the block (see Food Products Formulary, ibid, at pp. 290–291). This type of fish flesh can be treated with the protein fortifier prior to formation of the block.

This invention will be more fully illustrated in the example which follows.

EXAMPLE

Halibut eviscerated and washed is manually stitch injected (needles 2.54 cm apart) at a rate of 10% with a solution containing 30% of a whey protein concentrate (50% whey protein) and 5% sodium tripolyphosphate. The halibut is frozen and cut into steaks. Increased yield without appreciably diminished protein level is expected. An estimated 8% retained pump supplements the fish protein by an estimated 1.2 grams or about 15% protein added in the liquid injected. Halibut has about 15-20% protein.

What is claimed is:

1. Protein fortified intact fish flesh, comprising intact fish flesh as the sole fish source, having incorporated into the muscle tissue of said intact fish flesh a whey protein fortifier composition having more than about 30% by weight whey protein on a dry solids basis wherein said protein fortifier composition consists essentially of about 100% of a whey protein concentrate as the sole protein source, wherein said whey protein concentrate is prepared by neutralizing whey prior to protein concentration thereof, and wherein said whey protein fortifier composition being hydratable for incorporation into said fish flesh.

2. The protein fortified fish flesh as recited in claim 1 wherein said fortifier composition is used in an amount sufficient to supplement the protein content of the fish flesh at least about 1% by weight.

3. The protein fortified fish flesh as cited in claim 1 wherein said whey protein fortifier composition is a whey protein concentrate having from about 40% to about 60% by weight protein.

4. The protein fortified fish flesh of claim 1 wherein said fish flesh further has incorporated therein sodium and potassium salts of molecularly dehydrated phosphates having a molar ratio of alkali metal oxide to $P_2O_5$ of from about 0.9:1 to about 2:1.

5. The frozen product as recited in claim 4.

6. A method of protein fortifying intact fish flesh comprising incorporating into the muscle tissue of intact fish flesh, as the sole fish source, a hydrated whey protein concentrate based protein extender consisting essentially of about 100% whey protein concentrate as the sole protein source, wherein said whey protein concentrate has more than 30% by weight whey protein on a dry solids basis, and wherein said whey protein concentrate is prepared by neutralizing whey prior to protein concentration thereof.

7. The method as recited in claim 6 wherein said fish flesh further has incorporated therein sodium and potassium salts of molecularly dehydrated phosphates having a molar ratio of alkali metal oxide to $P_2O_5$ of from about 0.9:1 to about 2:1.

8. The method as recited in claim 7 wherein the product is frozen after incorporation of the extender and the phosphate.

9. The method as recited in claim 6 wherein said incorporating is accomplished by a method selected from the group consisting of stitch pumping, vein pumping, artery pumping, injection and combinations thereof.

* * * * *